United States Patent [19]

Semar et al.

[11] Patent Number: 5,270,270
[45] Date of Patent: Dec. 14, 1993

[54] PROCESS FOR PRODUCING DENSE-SINTERED CORDIERITE BODIES

[75] Inventors: Wolfgang Semar; Wolfgang Pannhorst, both of Mainz, Fed. Rep. of Germany

[73] Assignee: Schott Glaswerke, Mainz, Fed. Rep. of Germany

[21] Appl. No.: 36,292

[22] Filed: Mar. 24, 1993

Related U.S. Application Data

[63] Continuation of Ser. No. 896,794, Jun. 9, 1992, abandoned, which is a continuation of Ser. No. 484,941, Feb. 26, 1990, abandoned.

[30] Foreign Application Priority Data

Feb. 25, 1989 [DE] Fed. Rep. of Germany ....... 3905895

[51] Int. Cl.$^5$ .................... C04B 35/18; C04B 35/48
[52] U.S. Cl. ........................................ 501/119; 501/9; 501/103; 501/104; 264/66
[58] Field of Search ............... 501/9, 104, 105, 69, 501/118, 119, 32; 264/65, 66

[56] References Cited

U.S. PATENT DOCUMENTS

| | | | |
|---|---|---|---|
| 3,849,145 | 11/1974 | Pitha | 106/39.6 |
| 3,926,648 | 12/1975 | Miller | 106/39.6 |
| 4,495,300 | 1/1985 | Sano | 501/104 X |
| 4,540,621 | 9/1985 | Eggerding et al. | 501/118 X |
| 4,542,109 | 9/1985 | Pasto | 501/97 |
| 4,576,919 | 3/1986 | Hodge | 501/9 |
| 4,745,092 | 5/1988 | Prunier, Jr. | 501/108 X |
| 4,810,681 | 3/1989 | Hayakawa | 501/105 X |
| 4,855,259 | 8/1989 | Claussen et al. | 501/9 |
| 5,045,402 | 9/1991 | Adams, Jr. et al. | 501/9 X |

FOREIGN PATENT DOCUMENTS

| | | |
|---|---|---|
| 0255023 | 2/1988 | European Pat. Off. |
| 2517743 | 4/1975 | Fed. Rep. of Germany |
| 3445765 | 12/1984 | Fed. Rep. of Germany |
| 1602590 | 11/1981 | United Kingdom |

OTHER PUBLICATIONS

Nieszery et al., "Sintering and Strengthening of Cordierite With Different Amounts of Zirconia," High Tech Ceramics, 1987.

Travitzky et al., "Mikrostruktur und mechanische Eigenschaften von Cordierit-ZrO$_2$-Zusammensetzungen", Fortschrittsberichte der Deutschen Keramischen, Nov. 1986.

Haussmann, "Verbesserung des Sinterverhaltens und der mechanischen Eigenschaften einer Cordieritmatrix"..., Nov. 1988.

Rabinovich, "Cordierite glass-ceramics produced by sintering," Advances in Ceramics, vol. 4, Am. Ceramic Soc., 1982, pp. 327-333.

A. Negro et al., "Sintered Materials in the Systems Yitania-Cordierite Glass and Zirconia-Cordierite Glass," *Ceramurgia*, vol. 2, No. 2, Mar. 1973, Turin, Italy.

*Primary Examiner*—Karl Group
*Attorney, Agent, or Firm*—Millen, White, Zelano & Branigan

[57] ABSTRACT

A process for producing dense-sintered cordierite bodies and zirconium dioxide-reinforced cordierite bodies with a maximum of 50% by weight of ZrO$_2$ is described, wherein a powder of cordierite particles of stoichiometric composition and, if appropriate, ZrO$_2$ of a particle size of less than 3 μm is heated at temperatures above 800° C. at a rate of temperature rise of less than 5° C. per minute. Virtually pore-free sintered bodies having outstanding mechanical properties can be produced by the process.

20 Claims, No Drawings

PROCESS FOR PRODUCING DENSE-SINTERED CORDIERITE BODIES

This application is a continuation of application Ser. No. 07/896,794, filed Jun. 9, 1992, now abandoned, which is a continuation of application Ser. No. 07/484,941, filed Feb. 26, 1990, now abandoned.

The invention relates to a process for producing dense-sintered cordierite bodies.

Stoichiometric crystalline cordierite ($2Al_2O_3 \times 2MgO \times 5SiO_2$) has a low density, a low coefficient of thermal expansion, and a low thermal and electrical conductivity. At the same time, a loss of strength starts only at temperatures above 1000° C. Owing to the combination of the said properties, cordierite can thus contribute to the solution of certain technical problems or meet demand criteria which can only be partially satisfied or not at all by other ceramic materials, so that cordierite has retained a remarkable position on its own in the field of ceramic materials. Thus, cordierite has been widely used as a catalyst support in purification of exhaust gas from motor vehicles or as a substrate material in the electrical engineering. Its use as a component with a load-bearing function has, however, failed hitherto because of the low strength and fracture toughness of the material.

A prerequisite for an improvement of the mechanical properties is an almost pore-free molding or a component having a homogeneous distribution of minute pores without a critical fracture-initiating effect. The production of dense-sintered bodies has hitherto been restricted to a considerable degree by the low sintering activity of stoichiometric cordierite, so that additional measures must be taken in order to achieve the desired result. In this regard, sintering aids or additives have been introduced (U.S. Pat. Nos. 4,495,300 and 4,745,091) or the possibility of sintering chemically modified cordierites still glassy and then crystallizing them (Rabinovich, E. M.: Cordierite glass-ceramics produced by sintering, Advances in Ceramics, volume 4, American Ceramics Society 1982, pages 327–333) which in both cases restricts use at high temperatures and leads only to slight increases in strength.

The sintering of pure stoichiometric cordierite up to high densities has heretofore failed (U.S. Pat. No. 3,926,648), which is explicitly stressed again in, for example, U.S. Pat. No. 4,745,092 in column 1, line 40. An experiment carried out within the scope of the cited patent (Comparative Experiment 1) leads only to a cordierite body having a density of 0.96. U.S. Pat. No. 4,540,621 describes the production of substrate materials from cordierite by a sintering process which must take place in an inert gas or a reducing atmosphere in order to avoid oxidation of the metallic layer which is applied at the same time.

In this connection, it is also known that an increase in the fracture strength and fracture toughness of the composite system produced can be obtained by dispersing a second phase (reinforcing component) having a higher modulus of elasticity and a higher strength than the cordierite matrix. In particular, it is known to use $ZrO_2$ particles as a reinforcing component, since there is an additional possibility in this case of effecting a phase transformation in the $ZrO_2$ from tetragonal to monoclinic in the process zone of a crack point as an additional reinforcing mechanism by appropriate selection of the particle size and by appropriate stabilizing additives (German Offenlegungsschrift 3,445,765).

From Nieszery, K.; Weiskopf, K. L., Petzow, G.; Pannhorst, W.: Sintering and strengthening of cordierite with different amounts of zirconia, P. Vincenzini (editor): High Tech Ceramics; Materials Science Monograph 38A, Amsterdam: Elsevier 1987, pages 841–849) and (Haussmann, K.: Verbesserung des Sinterverhaltens und der mechanischen Eigenschaften einer Cordieritmatrix durch Einlagerung Beindisperser $ZrO_2$-Teilchen [Improvement of the sintering behaviour and mechanical properties of a cordierite matrix by incorporation of finely dispersed $ZrO_2$ particles], doctorate thesis, Stuttgart University (1988), it is known to produce various cordierite/$ZrO_2$ mixing ratios by grinding. However, the grinding balls of 2–3 mm diameter used do not allow a particle size of 90% < 1.5 μm to be obtained under the conditions described. Considerably smaller grinding balls (for example, smaller than 1.5 mm diameter) are necessary for this purpose. The indicated grain size distribution, measured on a micrograph, does not indicate the real grain size distribution, since only randomly distributed section faces of the grains are measured. The largest diameter of a grain is relatively rarely measured in this method. It follows from this that the real particle size is considerably above the measured values.

The green density of 65% of the theoretical density, produced by cold-isostatic pressing of these mixtures, is comparatively low, as is the indicated lower limit of the final density of 0.97 achieved after sintering, which is reached at a rate of temperature rise of at least $10K \times min^{-1}$. At a rate of temperature rise of less than $10K \times min^{-1}$, significantly more porous bodies are obtained. A relative density of 0.9 is reported as the maximum value for the sintering of pure unreinforced crystalline stoichiometric cordierite.

German Offenlegungsschrift 3,445,765 describes inter alia, the sintering of compacts of cordierite/$ZrO_2$ powder mixtures. To obtain high densities and high bending fracture strength values (220–310N/mm²), the cold-isostatically pressed moldings are sintered therein in a Si-containing atmosphere at temperatures between 900° and 1400° C. Moldings sintered only in air show, by contrast, a significantly lower density and flexural bending strength. Strength values of less than 150 N/mm² are reported as the strength values of cordierite sintered in air.

To produce power mixtures containing more than 51% by weight of zirconium oxide, corresponding to 30% by volume of $ZrO_2$, and stoichiometric cordierite (Travitzky, N. A. et al.: Microstructure and mechanical properties of a cordierite-$ZrO_2$ dual composite. Fortschrittsberichte der DKG: Werkstoffe, Verfahren, Anwendung; [German Ceramic Society progress reports: Materials, Processes, Application]; volume 2, issue no. 3 (1986/87, pages 51–58), corresponding powder blends are ground in an attritor mill, dried and finally pressed cold-isostatically under 3,000 bar. For sintering the green compacts thus produced, a sintering rate of about 10° C./minute and a maximum final temperature of 1400° C. are likewise recommended. As a result of the sintering process, a structure with a grain size of between 1 and 3 μm is present in the sintered body. The maximum strength values are between 200 and 270 N/mm².

In European Published Application 0,255,023, the use of a non-stoichiometric cordierite chemically modified by means of $P_2O_5$ and $B_2O_3$ is described, which is reinforced by $ZrO_2$ particles. The chemical modification of the cordierite serves for extending the sintering interval and suppressing the crystallization of the cordierite, so that the cordierite can be sintered in the glassy state. Here again, however, the attainable strengths are not satisfactory, especially at higher temperatures.

The production of composite bodies from silicon nitride and cordierite by sintering in an inert atmosphere at temperatures between 1400° C. and 1800° C. is described in U.S. Pat. No. 4,542,109. The cordierite component introduced as a sinter aid into the silicon nitride body is here produced only during the sintering process in situ from the required individual oxide constituents which are premixed as a powder. The formation of the cordierite here takes place via intermediate phases, the individual reactions proceeding sufficiently fast only if small quantities of $ZrO_2$ are present. In this publication, strength values are reported only for hot-pressed moldings. Thus, for example, a molding with about 40% by volume of cordierite has a strength of between $200N/mm^2$ and $300N/mm^2$. The considerably lower strength properties always present in composite bodies sintered without pressure are not mentioned.

It is therefore desirable to provide a process for producing dense sintered cordierite bodies having a relative density greater than or equal to 0.99. Desirably such a process should be suitable for producing large-volume cordierite bodies and the sintering step should be capable of being carried out in air.

SUMMARY OF THE INVENTION

A process is provided for producing dense-sintered cordiarite bodies which optionally can be reinforced with up to about 50% by weight of zirconium dioxide. The cordiarite powder of largely stoichiometric composition having a particle size of less than about 3 μm is compressed to form a green body having a density of at least about 0.67. This body is sintered at temperatures up to 1400° C. and, starting at a temperature of 800° C., the temperature is increased at a rate of less than 5K per minute until the final sintering temperature is reached, up to relative densities greater than or equal to 0.99. Optionally, heating can continue at the final temperature up to about 4 hours. Dense-sintered cordierite bodies optionally reinforced with zirconium dioxide are produced which have relative densities of at least 0.99.

The cordierite powder used in the process of the present invention is a powder consisting of cordierite particles of largely stoichiometric composition, that is to say that every cordierite particle should largely have the stoichiometric composition, in contrast to many hitherto known processes in which the stoichiometric composition applies only statistically across a large quantity of particles. Preferably, each particle deviates from the stoichiometric composition of cordierite by less than 5%. Such a powder is appropriately prepared via the glass phase since, in this case, particularly homogeneous composition can be obtained. The preparation of cordierite via the glass phase is well known and described, for example, in German Patent Specification 2,517,743, Example 2, or in U.S. Pat. No. 3,849,145. Apart from the small quantity of impurities which are determined above all by the raw materials and the melting system used, the quality of the cordierite powder produced is determined by the homogeneous composition of the cordierite melt throughout the entire volume, which is accomplished by melting the raw materials and subsequent homogenization by stirring. As a result of the melting, concentration gradients in the molten state are levelled out. An equivalent cordierite quality cannot be obtained by mixing the individual components and a subsequent solid-state reaction at elevated temperatures, as normally used for the production of cordierite materials. The sol/gel process known per se can also be used for producing high-quality cordierite powder.

The cordierite thus produced is then ground to a powder having a particle size of less than about 3 μm, about 90% by weight of the powder having a particle size of less than about 1.5 μm. A grain size of more than about 3 μm leads to sintered bodies of lower density and strength.

The cordierite powder can contain up to 50% by weight of $ZrO_2$ powder of a grain size smaller than or equal to about 3 μm. Highly pure, commercially available zirconium dioxide powder having a crystallite size of less than 0.1 μm, which is fixed together with the cordierite powder and ground, is preferred. The zirconium dioxide serves in a manner known per se for further reinforcement of the cordierite bodies. Surprisingly, it was found that, up to a zirconium dioxide content of 50% by weight, the strength of the resulting bodies increases, whereas no increase in or decrease in strength occurs in conventional processes at zirconium dioxide contents of more than 30% by weight. Especially when zirconium dioxide powder is used for reinforcement, it is advantageous to use a cordierite powder which is as fine-grained as possible. The smaller the cordierite grains, the more often a continuing crack strikes the homogeneously distributed zirconium dioxide reinforcing component, that is to say the greater is the reinforcing effect.

The powder or the powder mixture thus obtained is then compressed to form a green compact having a relative density of at least 0.67. If this green density is not reached, a body having adequate strength properties can frequently no longer be obtained. The powder is either pre-pressed uniaxially and then compacted cold-isostatically in a resilient envelope of plastic, or a resilient envelope of plastic (for example of silicone rubber) is filled directly and then pressed cold-isostatically.

The addition of pressing aids (binders and lubricants) is not necessary for the compression, even through the addition of appropriate pressing aids, for example magnesium stearate, carbowax, amide wax or the like, can be helpful in achieving high green densities or has a favorable effect on a machining treatment of the green compacts after the cold-isostatic pressing.

For further densification, the cold-isostatically pressed specimens are subjected to a sintering process. The known sintering atmospheres such as inert gases, vacuum or a silicon-containing atmosphere can be used as the sintering atmosphere, but air is preferred as the sintering atmosphere. The sintering is carried out from a starting temperature of the green compact of 800° C. up until the final sintering temperature is reached at a rate of temperature rise (heating rate) of less than 5K per min. Higher heating rates lead to an accelerated sintering process, that is to say to higher sintering rates (equal to change of density per unit time) and, connected with this, to an inclusion of pores in the sintered body. Especially in the case of large-volume sintered bodies, this is a particularly noticeable interference, since a pronounced temperature profile arises in these bodies due to the low thermal conductivity of the material which is to be densified. At high heating rates, this pronounced temperature profile not only leads to a considerable pore volume in the interior of the sintered body, but also to thermal stresses, whereby the proportion of crack formation during the sintering of relatively large bodies increases considerably. Heating rates of less than 4K per min, especially of from 1K per min - 4K per min, are preferred, because good sintered products are obtained in this range within an acceptable period of time. Furthermore, the low heating rates of less than 5K per min surprisingly also allow a final sintering temperature which is markedly below the usual one. The heating rates should not be less than 0.5K per min since, on the one hand, the sintering time increases too sharply and, on the other hand, there is risk of undesired reactions occurring due to an unduly long stay in the region of high temperature.

The low heating rate should be applied starting at a sintering temperature of 800° C. The temperature limit of 800° C. must be adhered to above all if a cordierite powder is used which is still in the glassy state. In the case of a cordierite powder which is fully crystallized, the low heating rate must be adhered to only from a temperature of 1000° C. In general, adherence to the low heating rates within the indicated temperature interval is not necessary until the relative density of the body has risen to 0.75. Especially in mass production allowance for this fact can lead to shortening of the production process.

In the production of unreinforced cordierite bodies from glassy powder, a final temperature of 1050° C. is sufficient. If crystalline cordierite powders are used, the final sintering temperature can be up to 1400° C., in the manner known per se. However, a final sintering temperature which is between 1300° C. and 1360° C. is preferred. This temperature, which is significantly lower than the final sintering temperature of 1400° C. generally used, has not only the advantage of saving energy, a shorter sintering time and the fact that less expensive sintering furnaces can be used, but has also further systematic advantages which are described below, especially if a powder mixture of cordierite and zirconium dioxide is used.

After the final sintering temperature has been reached, the body to be sintered can, as is known per se, also be held at this temperature for up to a further four hours, in order to achieve further compaction. In the sintering process according to the invention, a holding time of less than two hours, in particular of 0-1 hour, is in general sufficient.

The desired final sintering temperature has been reached when the body which is to be sintered, if appropriate with a subsequent holding time, has reached a relative density of 0.99 or more. In the process according to the invention, this final temperature is 1050° C. for unreinforced glassy cordierite bodies, and between 1300° C., in particular between 1300° C. and 1350° C., if crystalline powder is used. At low heating rates, the final temperature is in the lower part of the indicated range, and it rises to higher values at higher heating rates. Good results are obtained, for example, at a heating rate of 1K per min with a final temperature of 1300° C. and a holding time of one hour, whereas a final temperature of 1350° C. likewise with a holding time of one hour, is preferred at a heating rate of 3K per min. In a manner known per se, the cordierite powder can also contain $ZrO_2$ particles for improving the mechanical properties of the finished sintering body. Up to a content of 50% by weight of $ZrO_2$ powder, an increase in strength can be achieved. The grain size of the $ZrO_2$ powder should be about 3 μm or less. The powder of pure $ZrO_2$ having a crystallite size of less than 0.1 μm, in particular a powder having a crystallite size in the range from 0.06 μm to 0.02 μm, is preferred here. $ZrO_2$ powders having such crystallite sizes are commercially available. Both pure $ZrO_2$ powders and those which have been stabilized tetragonally and/or cubically in a manner known per se by small additions of MgO, CaO, $Y_2O_3$ can be used.

However, the final sintering temperature depends not only on the selected heating rate but, if a mixture of cordierite powder and zirconium dioxide powder is used, also on the mixing ratio of these two substances and, to a smaller extent, also on the nature of the zirconium dioxide powder used, for example on whether the zirconium dioxide powder is stabilized or unstabilized, and on the particle size of the zirconium dioxide powder. The optimum final sintering temperature can easily be determined by any person skilled in the art by means of a few experiments, for example, with the aid of a commercially available sintering dilatometer.

The maximum final temperature and the holding time also affect the type of the microstructure produced in the composite bodies. At low final temperatures, the incorporated zirconium dioxide powders form network-like structures along the cordierite grain boundaries, with a crystallite size of between 0.1 and 0.25. It follows from this that the zirconium dioxide crystallites introduced this that the zirconium dioxide crystallites introduced originally have sintered together. Higher final temperatures and longer holding times promote the growth of the zirconium dioxide grains until finally they are homogeneously distributed as individual grains of a size of up to 1 micron at largely regular spacings between the cordierite grains.

Using the knowledge of the rate of growth of the zirconium dioxide crystallites as a function of the temperature and time, the maximum zirconium dioxide particle size can thus be adjusted in a controlled manner.

In the sintering at high final temperatures and long holding times, as in the state of the art, it is to be noted that increasingly a reaction between cordierite and zirconium oxide starts with the formation of zirconium silicate and spinel, which leads to a loss in strength, since the reinforcing component zirconium dioxide is consumed. This reaction can be observed on samples which were heated to 1400° C. at a heating rate of 1K per min. In the specimens, the final sintering temperature of which was in the preferred range of 1300° C.-1360° C., such a reaction was not detectable, the reason being the markedly lower final temperature.

The achievable mechanical strength values are an important criterion for evaluating the production process. The strength values are here affected by both the porosity of the finished sintered bodies and the size of the incorporated zirconium dioxide grains. The lower the pore volume, the smaller is the number of defects in the material and the higher is the achievable strength. Previous experience has also shown that the reinforcing mechanism gains with increasing size of the zirconium dioxide grains. Since the diffusion-controlled growth process of the zirconium dioxide grains is positively affected at a higher final temperature and a longer holding time, higher final temperatures and a longer holding time involve an increase in strength. However, it is to be noted that, at higher temperatures and longer holding times, a progressive reaction between the cordierite and the zirconium dioxide to form, for example, zirconium silicate is also to be observed, and this in turn leads to a decrease in the strength properties.

An increasing zirconium dioxide content also involves an increase in the strength of the sintered grains. It is surprising here that a marked increase in strength still occurs in the specimens, produced according to the invention, at a content of zirconium dioxide powder of more than 40% by weight, contrary to existing knowledge.

The advantages achievable by the invention are above all that cordierite sintered bodies or cordierite/-zirconium dioxide sintered bodies of high strength can be produced by simple means. Due to the low heating rate, it is possible to produce even large-volume sintered bodies, without having to fear that, during sintering, the bodies would be damaged by thermal stresses arising or that the interior of the sintered bodies would remain unduly porous. The relatively low final sintering temperatures made possible by the low heating rates have the result that the detrimental reaction of the zirconium dioxide with the cordierite very largely does not take place. Furthermore, by a suitable choice of the final sintering temperature and of the holding time at the final sintering temperature, the grain size or the growth of the zirconium dioxide crystallites in the sintered body can be influenced in a controlled manner.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following example, all temperatures are set forth uncorrected in degrees Celsius; and, unless otherwise indicated, all parts and percentages are by weight.

The entire disclosures of all applications, patents and publications, cited above and below, and of corresponding West German Application No. P 39 05 895.6, filed Feb. 25, 1989, are hereby incorporated by reference.

EXAMPLE 1

Cordierite powder or a mixture of cordierite and zirconium dioxide powder was ground for several hours, using isopropanol as the grinding fluid, in an attritor mill whose grinding vessel consisted of hard porcelain and whose grinding balls and stirrer consisted of 85/12% by weight of $Al_2O_3/SiO_2$. After grinding, the ground slip was dried under mild conditions and the maximum particle size was determined. As a secondary result, it was found that up to about 30% of the cordierite was transformed from the crystalline phase into the glassy or amorphous phase as a result of the grinding process. A rectangular block was first pre-pressed from the powder at 100 bar, and this was then compressed cold-isostatically by about 6000 bar to give a green compact having a high relative density (green density). Subsequently, the green compact was enclosed in an alumina muffle and sintered in a chamber furnace. In the sintering interval between 800° C. and 1350° C. the temperature was increased at a rate of 3K per min. If appropriate, the sintering is also followed by a holding time. The sintered bodies thus produced were worked into bending bars having dimensions of 3.5×4.550 mm×50 mm and subjected to a three-point bending test in a testing machine. The support distance was here 40 mm. The results are summarized in Table 1.

EXAMPLE 2

Mixtures as in Example 1 were ground for 16 hours by circulating grinding in a stirred ball mill having a grinding vessel coated with hard plastic and a stirrer unit. The grinding fluid used was a mixture of 90% by weight of water and 10% by weight of isopropanol. The grinding bodies used were alumina balls having a diameter of between about 0.6 and 1 millimetre. After the grinding process, the suspension was dried under mild conditions by freeze-drying and then processed further analogously to Example 1. The results are also summarized in the table.

EXAMPLE 3

A crystalline powder of 99%<60 μm having a composition approximating that of stoichiometric cordierite (about 50.5% by weight of $SiO_2$, about 34.3% by weight of $Al_2O_3$; about 14.2% by weight of MgO) was subjected to the production process described in Example 1.

The sintered bodies had a relative density greater than 0.99. The values for the bending strength can be taken from the attached table (Test 1).

EXAMPLE 4

Cold-pressed green compacts were produced as described in Example 1 from a mixture of 70% by weight of glassy stoichiometric cordierite (particle size 99%<40 μm and 30% by weight of $Y_2O_3$-stabilized zirconium oxide. One green compact was heated in the sintering interval between 800° and 1400° C. at 2.5K per min and, after the final temperature had been reached, cooled by switching the furnace off.

Between 800° and 900° C., the sample sinters in the glassy state from 0.68 to 0.80 relative density, the crystallization of the cordierite terminating the sintering process. The density of the resultant crystalline body remains almost constant between 900° and 1200° C. After further heating to 1400° C. and subsequent cooling, a sintered body having about 0.995 relative density is present at room temperature.

EXAMPLE 5

A glassy, that is to say amorphous, powder (99%<40 μm) having a composition according to Example 3 was subjected to the grinding and drying process described in Example 1.

After screening, the ground material was compressed cold-isostatically in a silicone rubber mould under a pressure of 6000 bar to give a circular cylinder. This green compact was then heated at 10° C./minute to 500° C., held there for 30 minutes at this temperature and finally heated at 4.5K per min to 1050° C. and then cooled to room temperature. The body sintered in this way had a relative density greater than 0.99.

In Table 1 below, the Tests No. 1 to 5, 11 and 12 were carried out according to Example 1, and Tests 6 to 10 according to Example 2. All the specimens have a grain size distribution in which 90% of the particles of the powder mixture are smaller than 1.3 μm. The 50% value was smaller than or equal to 1 μm. The heating rate chosen for the sintering of the composite bodies, starting at 800° C., was always 3K per min. The final densities achieved were always above 0.99 relative density. To reinforce the cordierite, zirconium dioxide stabilized with 3 mol % of $Y_2O_3$ was used without exception. The averages of the bending strength, indicated in the table, are based on the measurement of 6 bending bars in each case.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE 1

| Test no. | Cordierite/ $ZrO_2$ weight ratio (%) | Green density (%) | Final temperature (°C.) | Holding time (hours) | Strength Average/ maximum (N × mm$^{-2}$) |
|---|---|---|---|---|---|
| 1 | 100/0 | 70 | 1350 | 1 | 170/195 |
| 2 | 90/10 | 70 | 1350 | 1 | 217/248 |
| 3 | 70/30 | 70 | 1350 | 1 | 245/287 |
| 4 | 60/40 | 71 | 1350 | 1 | 297/308 |
| 5 | 50/50 | 71 | 1350 | 1 | 309/346 |
| 6 | 70/30 | 70 | 1350 | 0 | 288/322 |
| 7 | 70/30 | 70 | 1350 | 1 | 271/300 |
| 8 | 70/30 | 69 | 1350 | 2 | 279/287 |
| 9 | 70/30 | 69 | 1350 | 3 | 259/291 |
| 10 | 70/30 | 70 | 1360 | 1 | 273/290 |
| 11 | 70/30* | 73 | 1350 | 1 | 236/269 |
| 12 | 60/40* | 73 | 1350 | 1 | 305/319 |

What is claimed is:

1. In a process for producing dense-sintered, substantially stoichiometric, homogeneous cordierite or $ZrO_2$-reinforced, substantially stoichiometric, homogeneous cordierite bodies, wherein a cordierite powder or a $ZrO_2$/cordierite powder having up to 50% by weight $ZrO_2$, said $ZrO_2$ having a particle size of up to 3 microns, is compressed to form a green body which is compacted in a sintering process at final sintering temperatures of up to 1400° C., the improvement comprising compressing said cordierite powder or $ZrO_2$/cordierite/powder, said powder being compositionally homogeneous and having a particle size of less than about 3 μm, each cordierite particle of said powder having a substantially stoichiometric composition of cordierite wherein each particle of cordierite powder deviates from the stoichiometric composition by less than 5% to form a green body having a relative density of at least 0.67, sintering the body and sintering at a temperature of not lower than 800° C. and at least until after the body has a relative density of 0.75, increasing the temperature at a rate of less than 5K per min until the final sintering temperature is reached, optionally holding at said final sintering temperature, to obtain a relative density of at least 0.99 for the dense-sintered cordierite or $ZrO_2$-reinforced cordierite body.

2. Process according to claim 1, wherein said cordierite powder is a fully crystalline cordierite.

3. Process according to claim 1, wherein said cordierite powder is glassy, and said heating at a rate of less than 5K per min is started at 800° C.

4. Process according to claim 1, wherein the sintering is carried out at a heating rate of less than 4K per min.

5. Process according to claim 1, sintering is carried out at a heating rate of less than 5K per min within the sintering temperature range only after the body has a relative density of 0.75.

6. Process according to claim 2, wherein said heating rate increase of less than 5K per min is employed at least in a heating domain of from 10° C. to the final sintering temperature.

7. Process according to claim 1, wherein the sintering temperature is increased up to a final sintering temperature of from 1300° C. to 1360° C.

8. Process according to claim 1, wherein about 90% by weight of the cordierite powder has a particle size of less than about 1.5 μm and about 50% by weight of the powder has a particle size of less than about 1 μm.

9. Process according to claim 1, wherein the cordierite powder contains more than 40% up to about 50% by weight of $ZrO_2$ powder.

10. Process according to claim 9, wherein that the $ZrO_2$ powder has a crystallite size of less than about 0.1 μm.

11. Process according to claim 1, wherein the cordierite body is held at this temperature for up to four hours.

12. Process according to claim 1, wherein the sintered body is held at the final sintering temperature for a period of up to about 1 hours.

13. Process according to claim 1, wherein the final sintering temperature is reached when the body has a relative density of 0.99 or more.

14. Process according to claim 6, wherein the final heating temperature is between 1300° C. and 1360° C.

15. A process according to claim 1, wherein said rate of less than 5K per min. is not less than 0.5K per min.

16. In a process for producing dense-sintered cordierite bodies, wherein a cordierite powder is compressed to form a green body which is compacted in a sintering process, the improvement comprising compressing said cordierite powder, said powder being glassy and having a particle size of less than about 3 μm and each cordierite particle of said powder having a substantially stoichiometric composition of cordierite deviating from the stoichiometric composition by less than 5% to form a green body having a relative density of at least 0.67; sintering the body; and, in a heating domain of at least from 800° C. to the final sintering temperature, increasing the temperature at a rate of less than 5K per minute until the final sintering temperature is reached, optionally holding the resultant sintered body at said final sintering temperature, to obtain a density of at least 0.99 of the resultant dense-sintered body.

17. A process according to claim 16, wherein said final sintering temperature is sufficient at 1050° C.

18. Process according to claim 1, wherein the composition of the substantially stoichiometric cordierite is, on a percent by weight basis, $SiO_2$, 50.5; $Al_2O_3$, 34.3; and MgO, 14.2.

19. A process according to claim 1, wherein the sintering is conducted under an atmosphere selected from the group consisting of an inert gas, a vacuum, and air.

20. A process according to claim 1, wherein the sintering is conducted under an atmosphere of air.

* * * * *